(12) United States Patent
Metzinger et al.

(10) Patent No.: US 7,673,730 B2
(45) Date of Patent: Mar. 9, 2010

(54) COOLANT DISTRIBUTION DEVICE

(75) Inventors: Manuel Metzinger, Buehl (DE); Ivo Agner, Buehl (DE); Gabor Izso, Buehlertal (DE)

(73) Assignee: LuK Lamellen und Kupplungsbau Beteiligungs, Buehl (DE)

( * ) Notice: Subject to any disclaimer, the term of this patent is extended or adjusted under 35 U.S.C. 154(b) by 442 days.

(21) Appl. No.: 11/654,973

(22) Filed: Jan. 18, 2007

(65) Prior Publication Data

US 2007/0170034 A1 Jul. 26, 2007

(30) Foreign Application Priority Data

Jan. 26, 2006 (DE) ........................ 10 2006 003 923

(51) Int. Cl.
  *F16D 13/72* (2006.01)
  *F16N 13/20* (2006.01)
  *F04D 29/22* (2006.01)
(52) U.S. Cl. ............................... 192/70.12; 192/113.34; 184/31; 416/182; 416/236 R
(58) Field of Classification Search ............ 192/113.34, 192/113.35; 184/31; 416/185, 236 R, 236 A
See application file for complete search history.

(56) References Cited

U.S. PATENT DOCUMENTS

| 3,540,557 | A | * | 11/1970 | Hasselbacher et al. .... 192/18 A |
| 4,446,953 | A | | 5/1984 | Voss et al. |
| 4,473,144 | A | | 9/1984 | Allori |
| 4,762,465 | A | * | 8/1988 | Friedrichs .................... 416/185 |
| 4,971,184 | A | | 11/1990 | Lederman |
| 2003/0085094 | A1 | | 5/2003 | Miyoshi et al. |

FOREIGN PATENT DOCUMENTS

WO 2004/104439 12/2004

* cited by examiner

*Primary Examiner*—Richard M. Lorence
(74) *Attorney, Agent, or Firm*—Simpson & Simpson, PLLC

(57) ABSTRACT

A coolant distribution device for a wet-running clutch device and comprising several coolant distribution surfaces along which coolant is conveyed outwards in the radial direction. In order to increase the service lifetime of a wet-running clutch device the coolant distribution surfaces are implemented so that the coolant conveyed outwards in the radial direction has different axial coolant spray-off points and/or coolant spray-off devices.

9 Claims, 5 Drawing Sheets

COOLANT DISTRIBUTION DEVICE

CROSS-REFERENCE TO RELATED APPLICATIONS

This patent application claims priority of German Patent Application No. 10 2006 003 923.8, filed Jan. 26, 2006, which application is incorporated herein by reference.

FIELD OF THE INVENTION

The invention relates to a coolant distribution device for a wet-running clutch device and comprising several coolant distribution surfaces along which coolant is conveyed outwards in the radial direction. The invention furthermore relates to a wet-running clutch device with friction units on the driving side and the driven side, where the friction units are formed of a plurality of friction partners alternating in layers in the axial direction on the driving side and the driven side, where the friction partners can be pressed against one another in the axial direction to produce a frictional engagement.

SUMMARY OF THE INVENTION

It is a general object of the invention to increase the service lifetime of a wet-running clutch device, such as is known, for example, from U.S. Pat. No. 4,446,953.

The object is realized in a coolant distribution device for a wet-running clutch device with several coolant distribution surfaces along which coolant is conveyed outwards in the radial direction by the fact that the coolant distribution surfaces are implemented so that the coolant conveyed outwards in the radial direction has different axial coolant spray-off points and/or coolant spray-off devices. Through the configuration, according to the invention, of the coolant distribution surfaces the coolant can be conveyed in a targeted manner to different axial positions. Thereby, providing different clutch lining elements with coolant in a defined manner is made possible.

In a preferred embodiment, the coolant distribution device includes coolant distribution surfaces on ramps which, on the outside in the radial direction, have, as seen in the circumferential direction, different slopes. Due to the centrifugal force acting during operation, the coolant is conveyed outwards in the radial direction to the clutch lining elements. Due to the different slope angles of the ramps the coolant sprays off at different axial positions and in different directions at the radially outer edges of the ramps.

In an additional preferred embodiment, the coolant distribution surfaces are bounded by ribs. At a rotary speed the coolant comes into contact with the ribs, which preferably run helically from the interior outwards, and is thereby affected in its radial acceleration and direction of flight.

In an additional preferred embodiment, the coolant distribution device comprises a coolant distribution element which essentially has the shape of an annular disk and on which the coolant distribution surfaces are provided. Preferably, the coolant distribution element comprises a plane annular surface on the inside in the radial direction, from which the coolant distribution surfaces extend outwards.

In an additional preferred embodiment, the coolant distribution device comprises a drive sleeve. The drive sleeve serves preferably to connect the coolant distribution device in the manner of a drive to a coolant pump which is driven via the coolant distribution device.

In an additional preferred embodiment, the drive sleeve comprises coupling elements. The coupling elements preferably serve to connect the drive sleeve in the manner of a drive to a drive element of a coolant pump, which is driven via the coolant distribution device.

In an additional preferred embodiment, the coolant distribution device comprises a receiving plate. Preferably, the coolant distribution element is fastened to the receiving plate on the inside in the radial direction.

In an additional preferred embodiment, the receiving plate comprises coupling elements on the outside in the radial direction. The coupling elements preferably serve to connect the coolant distribution device, in such a manner that it cannot turn, to a clutch part, in particular a lamella carrier, where the clutch part or lamella carrier is in turn driven at the rotary speed of the motor.

In an additional preferred embodiment, the coolant distribution surfaces have a sharp edge on the outside in the radial direction. Thereby, an uncompromised spraying off of the coolant at the coolant spray-off points is ensured. Preferably, the edge has a radius which is less than 0.5 mm.

In a wet-running clutch device with friction units on the driving side and the driven side, where the friction units are formed from a plurality of friction partners alternating in layers in the axial direction on the driving side and the driven side, where the friction partners can be pressed against one another in the axial direction to produce a frictional engagement, the above-stated objective is realized by a coolant distribution device described in the introduction.

BRIEF DESCRIPTION OF THE DRAWINGS

Further advantages, features, and details of the invention follow from the following description, in which various embodiment examples are described in detail with reference to the drawings in which.

DETAILED DESCRIPTION OF THE INVENTION

Figure 1:
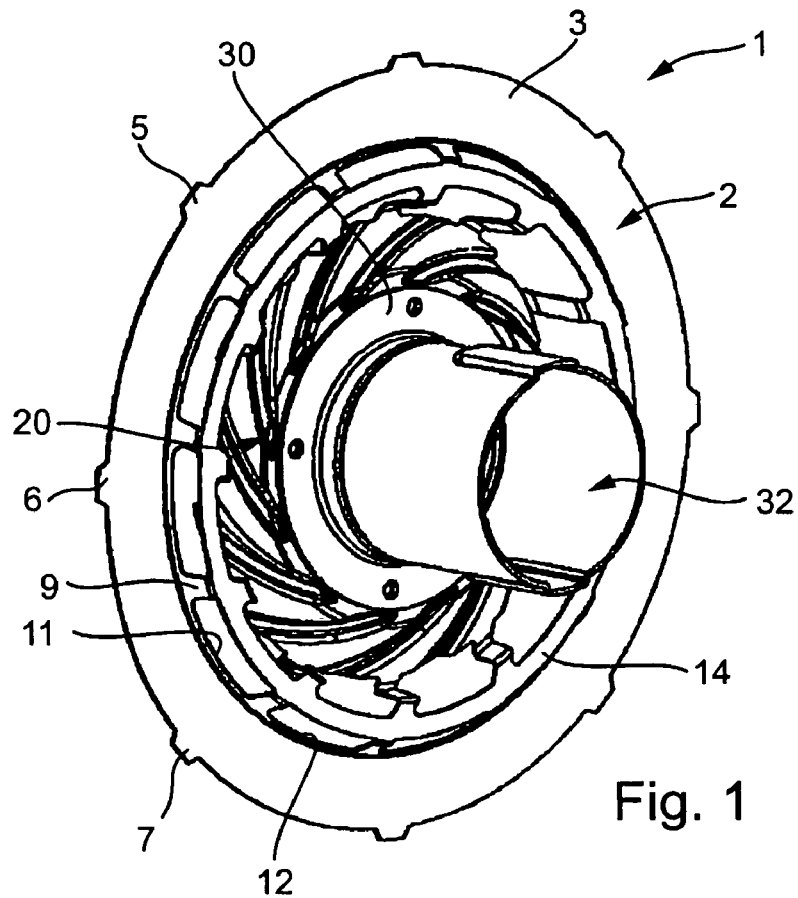
FIG. 1 is a perspective representation of a coolant distribution device according to the invention.
Figure 2:
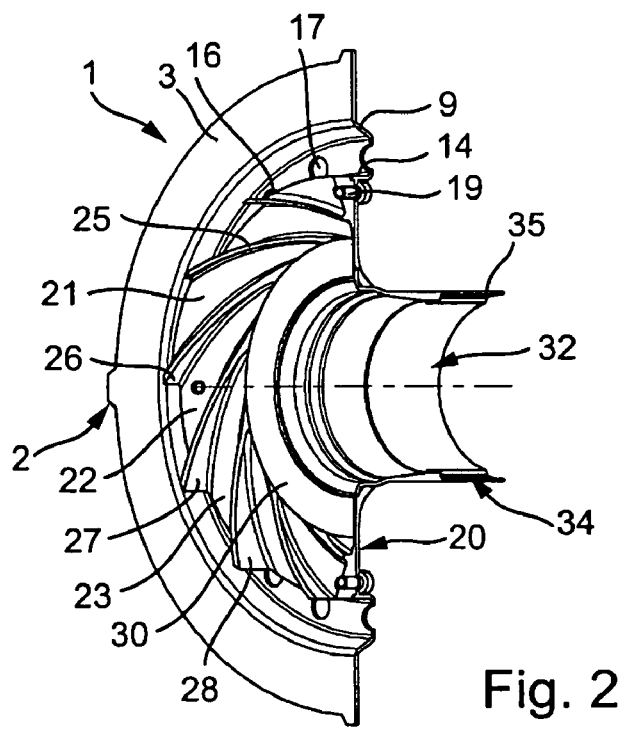
FIG. 2 is a perspective sectional representation of the coolant distribution device from FIG. 1.

In FIGS. 1 and 2 a coolant distribution device 1 is represented in perspective in different views. The coolant distribution device 1 serves to distribute the coolant. The coolant is preferably oil, which is used in a wet-running clutch device to cool friction lamellas. The coolant distribution device 1 according to the invention is thus also designated as an oil distributor. The coolant distribution device 1 comprises a receiving plate 2 which essentially has the shape of an annular disk 3. Teeth 5, 6, and 7, which are coupling elements, project, in the radial direction, outwards from the annular disk 3. A collar 9 is bent radially inwards from the annular disk 3. In the collar 9 a plurality of through-openings 11, 12 is provided, which make possible the passage of coolant in the radial direction. The collar 9 turns into a fastening flange 14, which comprises several through-holes 16, 17. The through-holes 16, 17 serve for the guiding through of fastening elements 19 with whose aid a coolant distribution element 20 is fastened to the receiving plate 2.

The coolant distribution element 20 comprises a plurality of coolant distribution surfaces 21 to 23, which are distributed uniformly over the circumference. The coolant distribution surfaces 21 to 23 are each bounded by two ribs 25, 26; 26, 27; 27, 28. Moreover, the coolant distribution surfaces 21 to 23 are surfaces of ramps which project, in the radial direction, outwards from a plane annular disk surface 30 and have different slopes. On the inside in the radial direction a drive sleeve 32 is mounted on the annular disk surface 30. The drive sleeve 32 has essentially the shape of a circular cylindrical shell on which two coupling elements 34, 35 are formed so as to be diametrically opposite one another. The receiving plate 2, the coolant distribution element 20, and the drive sleeve 32 can be connected to one another as one piece. However, instead of this, the parts can also be formed separately and fastened to one another with the aid of additional fastening elements such as screws or rivets. It is also possible to connect the individual parts to one another by a material lock, e.g., by welding.

Figure 3:
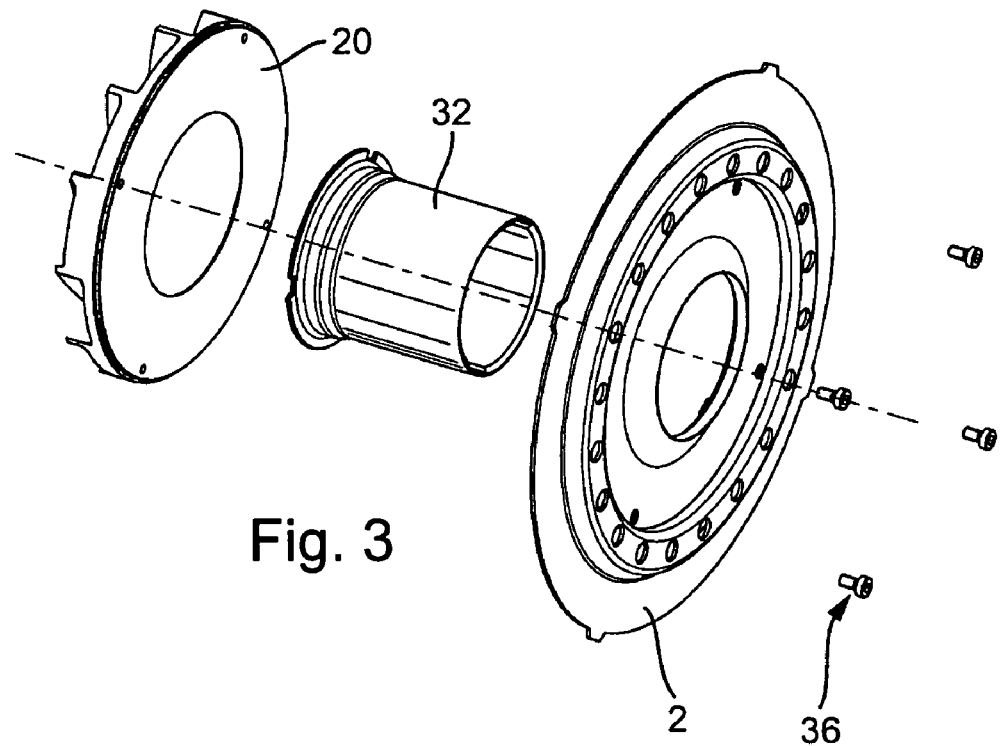
FIG. 3 is a three-part coolant distribution device, as represented in perspective in FIG. 1, in exploded representation.
Figure 4:
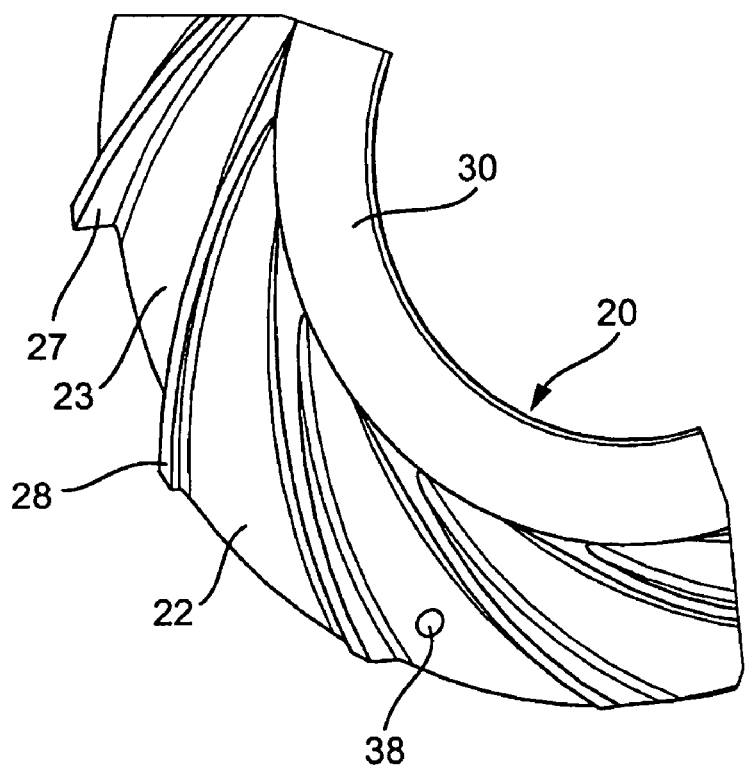
FIG. 4 is a section of a coolant distribution device from FIG. 3 in perspective representation.

In FIGS. 3 and 4 a coolant distribution device according to the invention is represented which is a three-part combination consisting of a receiving plate 2, coolant distribution element 20, and a drive sleeve 32. The coolant distribution element 20 is molded from plastic and can be fastened to the receiving plate 2 by snap-on connecting elements or a bayonet catch. Alternatively, the coolant distribution element 20 can also be fastened to the receiving plate 2 with the aid of screws 36 which are plugged into the coolant distribution element 20 via through-holes 38. The drive sleeve 32 and the receiving plate 2 are two separate sheet metal parts.

Figure 5:
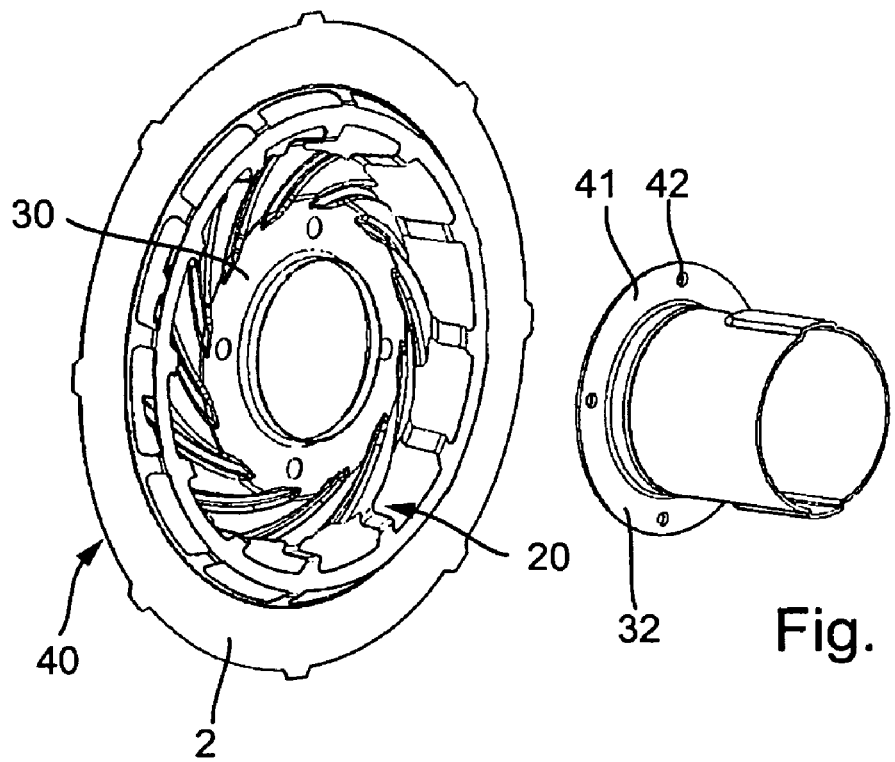
FIG. 5 is a two-part coolant distribution device, as represented in perspective in FIG. 1, in exploded representation.
Figure 6:
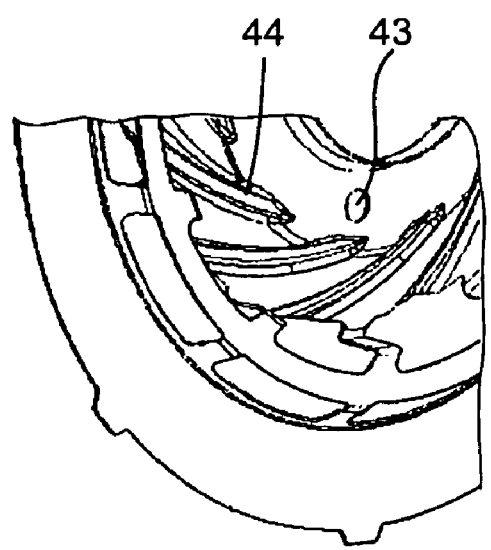
FIG. 6 is a section of a coolant distribution device from FIG. 5 in perspective representation.

In FIGS. 5 and 6 it is shown that the receiving plate 2 and the coolant distribution element 20 can also be combined as one part in a sheet metal part 40. The sheet metal part 40 can, for example, be made from sheet metal by stamping and re-forming. The drive sleeve 32 also formed as a sheet metal part can be fastened to the coolant distribution element 20 with the aid of (not represented) riveted bolts. For this purpose the drive sleeve 32 comprises a fastening flange 41 with through-holes 42. During assembly, the through-holes 42 of the fastening flange 41 are to be brought to cover additional through-holes 43 which are provided in the annular disk surface 30. In FIG. 6 it is furthermore indicated that the ribs 44 are made to stand out by re-forming of the original sheet metal.

Figure 7:
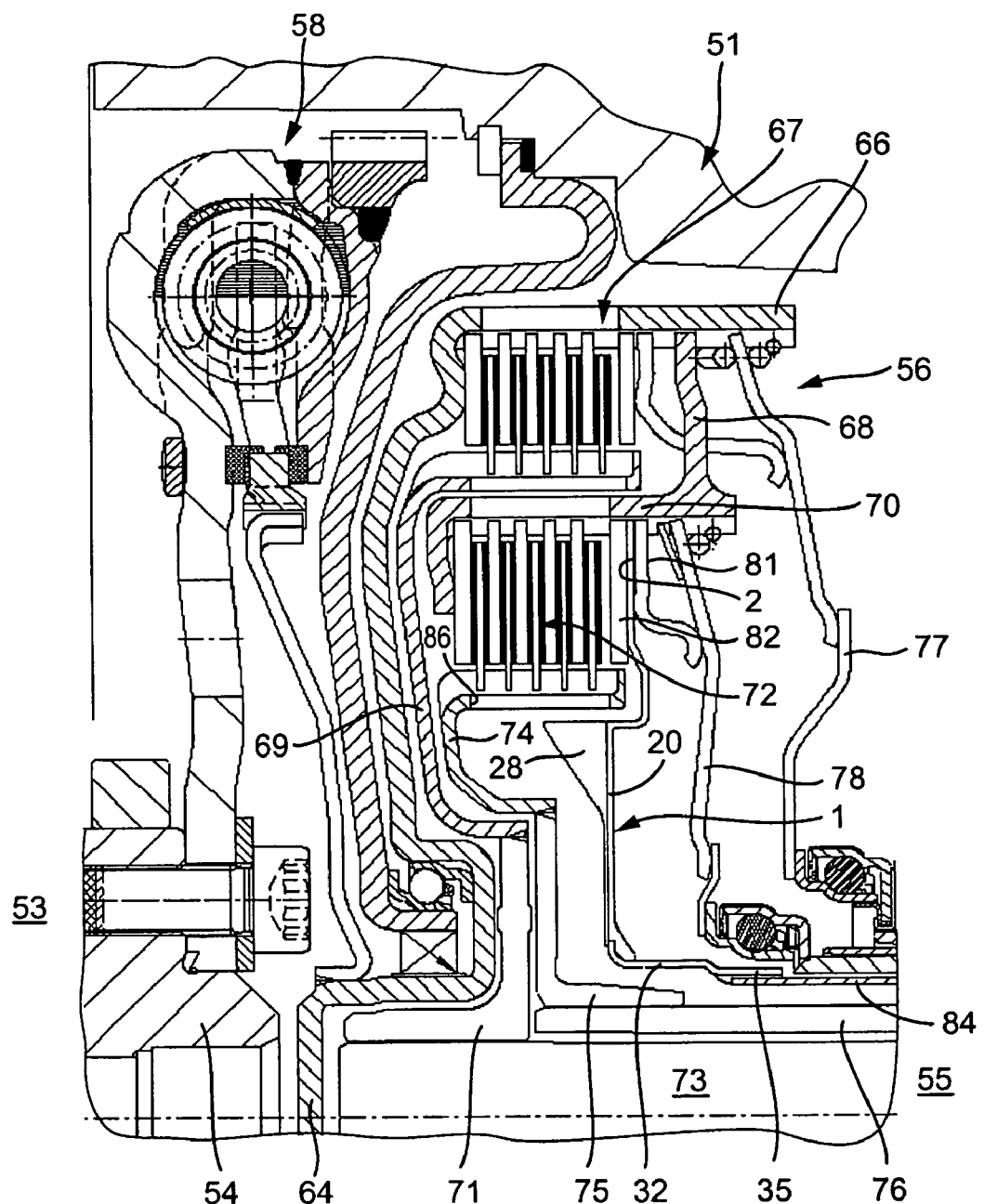
FIG. 7 is a torque transmission device with a coolant distribution device, as represented in FIGS. 1 to 6 in various views and embodiment examples, in half section.

In FIG. 7 a part of a drive train 51 of a motor vehicle is represented. A wet-running double clutch 56 in the lamellar mode of construction is disposed between a gear mechanism 55 and a drive unit 53, in particular an internal combustion engine from which a drive shaft 54 projects. Between the drive unit 53 and the double clutch 56 a rotary oscillation damping device 58 is connected. The rotary oscillation damping device 58 is a double-mass flywheel.

The drive shaft 54 of the internal combustion engine 53 is connected, via screw connections and in such a manner that it is fixed, to an input part of the rotary oscillation damping device 58. The input part of the rotary oscillation damping device 58 is coupled, with the interposition of coil springs, to an output part of the rotary oscillation damping device 58. The output part of the rotary oscillation damping device 58 is in turn connected, in such a manner that it cannot turn and via a connecting part with an integrated hub part, to an input part 64 of the double clutch 56. The clutch input part 64 is connected as one piece to an outer lamella carrier 66 of a first lamellar clutch arrangement 67. An inner lamella carrier 69 of the first lamellar clutch arrangement 67 is disposed, in the radial direction, within the outer lamella carrier 66. The inner lamella carrier 69 is fastened, on the inside in the radial direction, to a hub part 71 which is connected, via a toothing and in such a manner that it cannot turn, to a first gear mechanism input shaft 73.

The outer lamella carrier 66 of the first lamellar clutch arrangement 67 is connected, via a clutch part 68 and in such a manner that it cannot turn, to an outer lamella carrier 70 of a second lamellar clutch arrangement 72. An inner lamella carrier 74 of the second lamellar clutch arrangement 72 is disposed, in the radial direction, within the outer lamella carrier 70 and said inner lamella carrier is connected, on the inside in the radial direction and in such a manner that it is fixed, to a hub part 75. The hub part 75 is connected, via a toothing and in such a manner that it cannot turn, to a second gear mechanism input shaft 76 which is formed as a hollow shaft. In the second gear mechanism shaft 76 the first gear mechanism shaft 73 is disposed in such a manner that it can turn. The two lamellar clutch arrangements 67 and 72 are actuated via actuating levers 77 and 78 whose radially inner ends are supported on actuation bearings. The actuation bearings are actuated in the axial direction with the aid of actuating pistons.

The actuation force of the actuating lever 78 is transmitted via a pressure piece 81 to a lamella 82 of the lamellar clutch arrangement 72. In the axial direction, between the pressure piece 81 and the lamella 82, a receiving plate 2 of a coolant distribution device 1 is, as is represented in the FIGS. 1 to 6 in various forms of embodiment, suspended in the outer lamella carrier 70. The outer lamella carrier 70, which is connected, in such a manner that it cannot turn, to the outer lamella carrier 66, is connected in the manner of a drive to the crankshaft 54. Thus, the receiving plate 2 is turned during the operation of the internal combustion engine 53 at the rotary speed of the motor. The coolant distribution element 20 of the coolant distribution device 1 is disposed, in the radial direction, within the through-openings 86, which make possible the passage of coolant in the radial direction through the inner lamella carrier 74. The drive sleeve 32 of the coolant distribution device 1 is connected to a pump drive tube 84, which, in turn, is connected, in such a manner that it cannot turn, to a drive pinion of a (not represented) coolant pump.

In the wet-running double clutch 56 a special coolant, in particular a special coolant oil, is used in order to dissipate the friction heat arising during the operation of the lamellar clutch arrangements 67 and 72. To cool the friction linings the coolant oil in each case flows through between a steel lamella and a friction lamella, where a temperature change occurs. Through grooves in the friction linings the coolant oil is conducted outwards in the radial direction. In this way the coolant oil is conducted outwards in the radial direction through both lamellar clutch arrangements 67 and 72. Subsequently, the coolant oil is mixed with oil in a gear mechanism sump. From there it is then pumped to the cooler and then once again into the clutch. In order to supply the lining grooves uniformly with coolant oil, the coolant oil is conveyed via the special geometry of the coolant distribution surfaces to different axial positions. Due to the centrifugal force occurring during operation the coolant oil is ejected outwards in the radial direction onto the clutch linings where it can enter the lining grooves.

Figure 8:
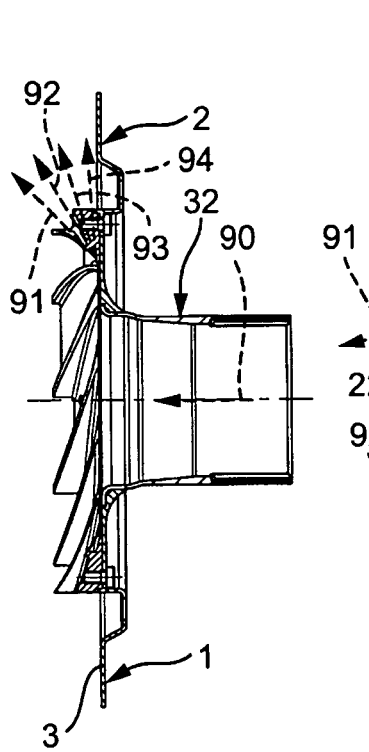
FIG. 8 is a view of a longitudinal section through the coolant distribution device represented in FIGS. 1 and 2.
Figure 9:
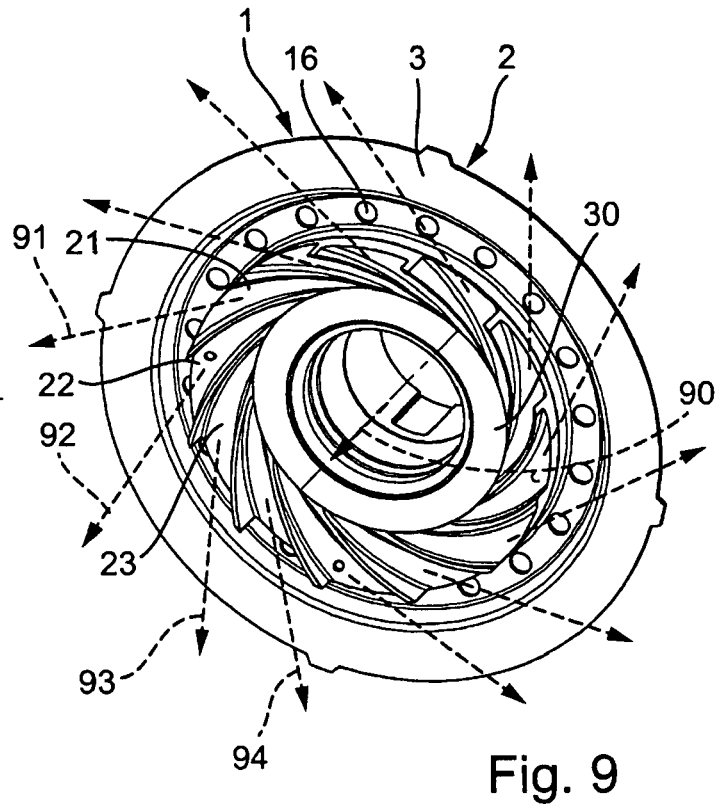
FIG. 9 is a perspective representation of the coolant distribution device represented in FIG. 8; and, FIG. 10 illustrates five different variants of a coolant distribution device with different geometries.

In FIGS. 8 and 9 it is indicated by an arrow 90 that the coolant oil conveyed by the coolant oil pump reaches, from the interior of the drive sleeve 32 and through the drive sleeve 32, the plane annular disk surface 30. Through the centrifugal force caused by the rotary speed of the motor the volume flow conveyed by the coolant oil pump is distributed uniformly on the coolant distribution surfaces 21 to 23, which are formed on the ramps. In so doing, the coolant is accelerated in addition by the ribs 25 to 28 and, at the end of the ramp, sprays off outwards in the radial direction predefined by the different ramp slope angles. Via the number of ramps the amount of coolant oil for a coating can be adjusted. Particularly heavily loaded friction linings can thus be cooled preferentially. The coolant oil spraying off at the end of the ramp is indicated by arrows 91 to 94. In FIGS. 8 and 9 one sees that the coolant oil sprays off of the different ramps in different axial directions and different tangential directions.

Figure 10:
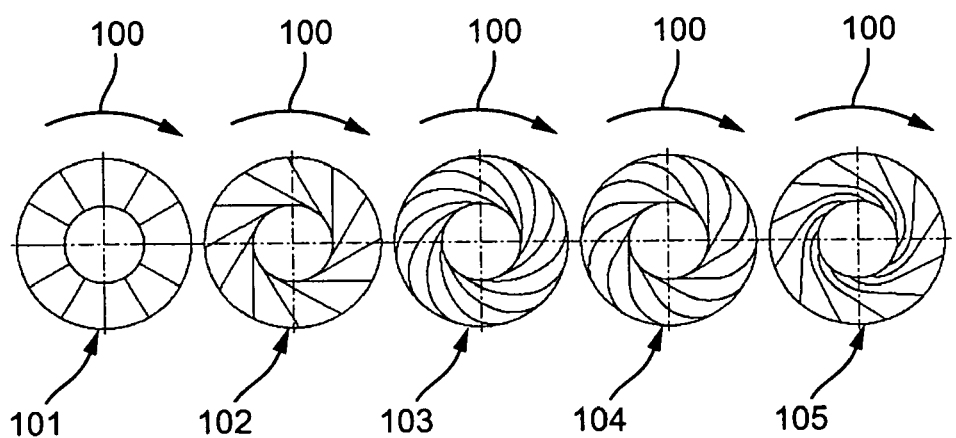

In FIG. 10 it is indicated that the coolant distribution element can have different ramp geometries 101 to 105. The direction of rotation in the clockwise sense is indicated in each case by an arrow 100. The greater the number of ramps is, the more uniformly the individual lining planes can be supplied. However, with too many ramps there is the danger that the oil is made turbulent in an undesirable manner. An uncompromised spraying off of the coolant oil in the predefined direction is made possible by a sharp edge. The corresponding radius is less than 0.5 mm. In 101 it is indicated that the ribs can extend exactly in the radial direction. In 102 it is indicated that the ribs can also extend in the tangential direction. In 103 it is indicated that the ribs each have the form of circular arcs which are disposed in the form of a spiral. In 104 and 105 it is indicated that the ribs can also consist of straight parts combined with circular arcs.

LIST OF REFERENCE NUMBERS

| | |
|---|---|
| 1 | Coolant distribution device |
| 2 | Receiving plate |
| 3 | Annular disk |
| 5 | Coupling element |
| 6 | Coupling element |
| 7 | Coupling element |
| 9 | Collar |
| 11 | Through-opening |
| 12 | Through-opening |
| 14 | Fastening flange |
| 16 | Through-hole |
| 17 | Through-hole |
| 19 | Fastening element |
| 20 | Coolant distribution element |
| 21 | Coolant distribution surfaces |
| 22 | Coolant distribution surfaces |
| 23 | Coolant distribution surfaces |
| 25 | Rib |
| 26 | Rib |
| 27 | Rib |
| 28 | Rib |
| 30 | Annular surface |
| 32 | Drive sleeve |
| 34 | Coupling element |
| 35 | Coupling element |
| 36 | Screws |
| 38 | Through-hole |
| 40 | Sheet metal part |
| 41 | Fastening flange |
| 42 | Through-hole |
| 43 | Through-hole |
| 44 | Rib |

-continued

LIST OF REFERENCE NUMBERS

| | |
|---|---|
| 51 | Drive train |
| 53 | Drive unit |
| 54 | Crankshaft |
| 55 | Gear mechanism |
| 56 | Double clutch |
| 58 | Rotary oscillation damping device |
| 64 | Coupling input part |
| 66 | Outer lamella carrier |
| 67 | First lamellar clutch arrangement |
| 68 | Coupling part |
| 69 | Inner lamella carrier |
| 70 | Outer lamella carrier |
| 71 | Hub part |
| 72 | Second lamella clutch arrangement |
| 73 | Gear mechanism input shaft |
| 74 | Inner lamella carrier |
| 75 | Hub part |
| 76 | Gear mechanism input shaft |
| 77 | Actuation lever |
| 78 | Actuation lever |
| 81 | Pressure piece |
| 82 | Lamella |
| 84 | Pump drive tube |
| 86 | Through-opening |
| 90 | Arrow |
| 91 | Arrow |
| 92 | Arrow |
| 93 | Arrow |
| 94 | Arrow |
| 100 | Arrow |
| 101 | Coolant distribution element |
| 102 | Coolant distribution element |
| 103 | Coolant distribution element |
| 104 | Coolant distribution element |
| 105 | Coolant distribution element |

What we claim is:

1. A coolant distribution device for a wet-running clutch device (56) comprising an annular disk-shaped distribution element (20) including:
   a plurality of curved ribs (25-28) extending from the annular distribution element (20) in a direction parallel to an axis of rotation for the coolant distribution device; and,
   a plurality of coolant distribution surfaces (21-23) along which coolant is conveyed outwardly in the radial direction, wherein the coolant distribution surfaces (21-23) are configured so that the coolant conveyed outwardly along at least one of the coolant distribution surfaces is directed to a different axial position than the coolant conveyed outwardly alonci another of the coolant distribution surfaces.

2. The coolant distribution device recited in claim 1, wherein the coolant distribution surfaces (21-23) are provided on ramps which, on the outside in the radial direction, have, as seen in the circumferential direction, different slopes.

3. The coolant distribution device recited in claim 1 wherein the coolant distribution surfaces (21-23) are bounded by ribs (25-28).

4. The coolant distribution device recited in claim 1 wherein the coolant distribution device (1) comprises a drive sleeve (32).

5. The coolant distribution device recited in claim 4 wherein the drive sleeve (32) comprises coupling elements (34, 35).

6. The coolant distribution device recited in claim 1 wherein the coolant distribution device (1) comprises a receiving plate (2).

7. The coolant distribution device recited in claim 6 wherein the receiving plate (2) comprises coupling elements (5-7) on the outside in the radial direction.

8. The coolant distribution device recited in claim 1 wherein the coolant distribution surfaces (21-23) have a sharp edge on the outside in the radial direction.

9. A wet-running clutch device (56) comprising, on the driving side and the driven side, friction units which are formed of, alternating in layers in an axial direction, parallel to an axis of rotation for the clutch device (56), on the driving side and the driven side, a plurality of friction partners which can be pressed against one another in the axial direction to produce a frictional engagement, and with a coolant distribution device (1) comprising an annular receiving plate (2) disposed in line with at least a portion of the friction partners in the axial direction, the annular receiving plate (2) disposed, in a radial direction orthogonal to the axial direction, outside of a plurality of coolant distribution surfaces (21-23) along which coolant is conveyed outwardly in the radial direction, wherein the coolant distribution surfaces (21-23) are configured so that the coolant conveyed outwardly along at least one of the coolant distribution surfaces is directed to a different axial position than the coolant conveyed outwardly along another of the coolant distribution surfaces.

* * * * *